United States Patent
Schwarz et al.

(10) Patent No.: US 9,604,523 B2
(45) Date of Patent: Mar. 28, 2017

(54) SYSTEM HAVING A CONTROL UNIT

(71) Applicant: DR. SCHNEIDER KUNSTSTOFFWERKE GMBH, Kronach (DE)

(72) Inventors: Josef Schwarz, Marktleuthen (DE); Florian Leistner, Coburg (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 0 days.

(21) Appl. No.: 14/907,224

(22) PCT Filed: Jul. 28, 2014

(86) PCT No.: PCT/EP2014/066144
§ 371 (c)(1),
(2) Date: Jan. 22, 2016

(87) PCT Pub. No.: WO2015/018679
PCT Pub. Date: Feb. 12, 2015

(65) Prior Publication Data
US 2016/0159197 A1   Jun. 9, 2016

(30) Foreign Application Priority Data
Aug. 9, 2013 (DE) .................. 10 2013 108 653

(51) Int. Cl.
*B60H 1/00* (2006.01)

(52) U.S. Cl.
CPC ..... *B60H 1/00871* (2013.01); *B60H 1/00971* (2013.01)

(58) Field of Classification Search
CPC .................. B60H 1/00971; B60H 1/00871
(Continued)

(56) References Cited

U.S. PATENT DOCUMENTS

| 7,139,648 B1 | 11/2006 | Martin et al. .................. 701/36 |
| 2005/0261815 A1 | 11/2005 | Cowelchuk et al. ........... 701/36 |

(Continued)

FOREIGN PATENT DOCUMENTS

| DE | 38 17 495 | 11/1989 | ............. B60R 16/02 |
| DE | 199 52 898 | 5/2001 | ............... B60R 1/00 |

(Continued)

OTHER PUBLICATIONS

German Examination Report (w/translation) issued in application No. 10 2013 108 653.5, dated Jun. 2, 2014 (21 pgs).

(Continued)

*Primary Examiner* — Marthe Marc-Coleman
(74) *Attorney, Agent, or Firm* — Hayes-Soloway P.C.

(57) ABSTRACT

Systems, kits and methods for transferring heat with a portion of a mammal are provided. Aspects of the subject systems include a negative pressure device configured to apply negative pressure to a portion of a mammal, and a temperature modulation device configured to contact the portion of the mammal under negative pressure in a manner sufficient to transfer heat with the contacted portion of the mammal, e.g., either remove heat or introduce heat into the contacted portion of the mammal. The disclosed systems and methods find use in a variety of different applications, including both therapeutic and non-therapeutic applications.

12 Claims, 4 Drawing Sheets

(58) Field of Classification Search
USPC .......................................................... 701/36
See application file for complete search history.

(56) References Cited

U.S. PATENT DOCUMENTS

| | | | |
|---|---|---|---|
| 2007/0276568 A1 | 11/2007 | Tozu ................................ | 701/49 |
| 2008/0254732 A1 | 10/2008 | Voigt et al. ................... | 454/143 |
| 2009/0216935 A1 | 8/2009 | Flick ............................. | 711/103 |
| 2010/0274410 A1 | 10/2010 | Tsien et al. ....................... | 701/1 |
| 2012/0214395 A1* | 8/2012 | Rais ..................... | B60H 3/0071 |
| | | | 454/152 |

FOREIGN PATENT DOCUMENTS

| | | | | |
|---|---|---|---|---|
| DE | 103 55 827 | 12/2004 | .............. | B60H 1/00 |
| DE | 10 2004 046 059 | 4/2005 | .............. | B60H 1/34 |
| DE | 10 2004 002 363 | 8/2005 | .............. | B60H 1/00 |
| DE | 10 2005 021 541 | 12/2005 | ............. | B60R 16/02 |
| DE | 10 2005 018 078 | 10/2006 | ........... | B60R 16/037 |
| DE | 10 2005 042 830 | 3/2007 | ............. | B60R 16/02 |
| DE | 10 2007 000 182 | 10/2007 | ................ | B60N 2/04 |
| DE | 20 2009 011 085 | 3/2010 | ............... | B60H 1/34 |
| DE | 10 2010 015 742 | 3/2011 | ........... | B60R 16/037 |
| DE | 10 2012 101 175 | 8/2012 | ................ | F01P 7/10 |
| DE | 10 2012 020 614 | 4/2014 | ........... | B60R 16/037 |
| EP | 0 908 338 | 4/1999 | ............... | B60H 1/00 |
| WO | WO 2007/004987 | 1/2007 | ............. | B60R 16/02 |

OTHER PUBLICATIONS

International Search Report and Written Opinion issued in corresponding PCT Patent Appln. Serial No. PCT/EP2014/066144 dated Sep. 26, 2014, with English translation of Search Report (14 pgs). English translation of International Preliminary Report on Patentability issued in corresponding PCT Patent Appln. Serial No. PCT/EP2014/066144 (6 pgs).

* cited by examiner

SYSTEM HAVING A CONTROL UNIT

BACKGROUND OF THE INVENTION

The invention relates to a system with a control unit for controlling at least one air nozzle, which is used in, for example, a motor vehicle, a passenger compartment, a load compartment or a vehicle driver cabin of a land, air or water vehicle. Such an air nozzle comprises a plurality of components such as, for example, longitudinal and transverse slats for influencing the air which flows out of the air nozzle and sometimes at least one closure flap which is arranged in the air feed tract of the air nozzle to interrupt, prevent or throttle the supply air flow.

In addition, air nozzles with separate slat blocks arranged at an angle relative to one another are known, wherein slats arranged parallel to and usually equidistantly from one another are present in the slat blocks or are mounted in the slat block to be rotatable about an axis. The slats of the individual slat blocks are coupled together in such a way that in each instance these can be adjusted in common, i.e. rotated about an axis.

An air nozzle with slats with at least one setting element, which is operable by way of a drive, for regulating the air flow, particularly for a ventilating system of a motor vehicle, is known from DE 10 2004 046 059. The setting element has a plurality of slats. At least one further setting element is actuable by way of a drive of the setting element.

A throttle device for air throughput through an air inlet is disclosed by DE 10 2012 101 175 A1. This throttle device for air throughput serves for use in coachwork of a motor vehicle. At least one pair of constrainedly controlled flaps, which are pivotable in opposite sense and which in one pivot setting let the air flow past without hindrance and in another setting close the air inlet, are provided, the flaps being able to be brought into intermediate settings. The flaps can be mechanically actuated by hand by a user or, however, actuated by way of an electric-motor drive.

An air nozzle with a spherical actuating device is known from DE 20 2009 011 085 U1. The air nozzle serves for conducting air flows, particularly for heating, air-conditioning and ventilating installations in motor vehicles. The air nozzle comprises at least one housing with horizontal and/or vertical air guide means pivotably arranged therein. In addition, a setting device for pivotation of the air guide means is known. Pivotation of the air guide means can be carried out mechanically by a user or, however, by means of an electric motor.

A setting device, particularly for setting at least one setting element of at least one air outflow means as well as at least one setting element of at least one air control element in at least one air guide channel in a housing of heating or an air-conditioning equipment in a motor vehicle, is known from DE 10 2004 002 363 A1. The setting device is equipped with control apparatus with at least one operating element and with at least two elements for transmission of movements of the operating element to the control element. At least one setting element of the air outflow means or at least one setting element of the air flow control element is actuable by the at least one operating element of the control apparatus.

A device and a method for user-specific setting of functions and/or apparatus internally of a vehicle are known from DE 10 2005 042 830 A1. A respective user-specific data set for at least one user, which data set includes at least one personal user profile of the user, is stored in the memory of a computer unit internal to a vehicle and/or in a portable memory unit. The user is identifiable at least on the basis of a personal identification, wherein functions and/or apparatus internal to the vehicle can be automatically configured specifically to user by means of the personal user profile, and at least the part, which comprises the personal user profile, of the user-specific data set can be encoded and can be decoded only after successful identification of the user, which takes place by means of the personal identification thereof.

A memory device for a user profile is known from DE 10 2005 018 078 A1. The user profile can be used for a plurality of electronic devices or functions in a motor vehicle and serves the purpose of providing, in a vehicle, data corresponding with the user profile without a user having to undertake corresponding settings. The user profile can be used in different vehicles through storage in the memory device.

A method for adapting a content for occupants of a vehicle during vehicle travel is known from DE 10 2010 015 742 A1. The method comprises the steps of determining a vehicle mode of the vehicle and determining suitable contents for the occupants on the basis of the vehicle mode. The vehicle mode represents one or more characteristics of the vehicle travel.

A system for customer-specific vehicle settings is known from DE 10 2005 021 541 A1. The system comprises a control unit which is adapted so as to communicate with a vehicle input point and with a vehicle auxiliary device. The system additionally comprises a data storage device in communication with a control unit for storing and retrieving electronic audio data for customized sounds which are related to actuation of the vehicle input source. The data storage device is, in addition, suitable for the purpose of storing and retrieving non-audio electronic data for customized settings for the vehicle auxiliary device. The memory unit is adapted so as to communicate at least with an input device for downloading the audio and non-audio data stored in the data of the data storage device.

A seating position control device for a vehicle is known from DE 10 2007 000 182 A1. The seating position control device has a lateral direction actuator for movement of a position of the vehicle seat in a lateral direction of the vehicle, a rotational direction actuator for moving the position of the vehicle seat in a rotational direction of the vehicle, a movement state identification device for identification of a movement state of the vehicle, and a lateral direction drive control device for movement of the position of the seat in the lateral direction of the vehicle by driving the lateral direction actuator on the basis of the movement state of the vehicle, which is identified by the movement state identification device.

A method for personalisation of a vehicle function is disclosed by DE 10 2012 020 614 A1. The method comprises the steps of determining a first identification of a first vehicle user on the occasion of sitting for the first time in a vehicle, detecting information about actuation of a function of the first vehicle by the vehicle user, generating an association of the detected information with the determined first identification and storing the association at least also outside the first vehicle.

WO 2007/004984 A1 discloses a control for vehicle settings, in which, after insertion of a driver card in a tachograph, user-specific settings for travel operation are undertaken. For that purpose, the tachograph is connected with control units of a vehicle.

It is disadvantageous in the known prior art that the components of an air nozzle or of a plurality of air nozzles, which is or are present in the motor vehicle and serve for ventilating the interior space of the motor vehicle, and the bus systems incorporated in a motor vehicle are not provided for the purpose of direct activation of the control of subsidiary components in the passenger compartment, such as air nozzles or components of air nozzles. There is also no provision for controlling, by way of a central control unit and a data arrangement via a bus system, the activation of an air nozzle or of components of an air nozzle and at the same time for storing the setting so that a setting, once selected, setting can be reset later. A central controlling of air nozzles or components of air nozzles and storage of setting parameters and setting positions of components of an air nozzle or of an air nozzle itself otherwise lead to overloading of the bus system with subsidiary components and to increased data traffic on the bus, which is not desirable.

Consequently, setting of the components or air guide means of air nozzles is, for the most part, primarily carried out directly by a user by way of mechanical setting means. Setting of the air guide means and/or further components of an air nozzle by way of a central control unit was not previously taken into consideration and, moreover, the bus system present in the motor vehicle was, as mentioned, loaded and to a degree overloaded with other data communication.

SUMMARY OF THE INVENTION

The present invention therefore has the object of indicating a control unit which makes it possible to also configure subsidiary components in a motor vehicle such as, in particular, an air nozzle and the associated components thereof to be individually, user-specifically and automatically settable and thus controllable and moreover makes it possible to store set configurations of the components in order to set the settings again and/or repeatedly at a later point in time.

This object is fulfilled by the configuration of a control unit with the features of claim 1.

Advantageous constructions of the invention are illustrated in the subclaims, the further description and, in particular, on the basis of the description of an actual embodiment by way of the figures FIG. 1 to FIG. 4, wherein the figure FIG. 3 consists of two figures, i.e. FIG. 3a and FIG. 3b.

The present invention relates to a system with a control unit for controlling at least one air nozzle. Such an air nozzle can be used in a motor vehicle, a passenger compartment, a load compartment or a vehicle driver cabin of a land, air or water vehicle. The air nozzle comprises components serving for influencing the air flow to be conducted through the air nozzle. The air flow, which issues from the air nozzle, can be influenced and deflected in orientation thereof by means of the components. In addition, the volume of air issuing from the air nozzle can be varied. The air nozzle comprises electronic units in the form of a memory unit and a position storage unit, wherein the memory unit is connected with at least one means by way of which the components of the air nozzle are settable or adjustable singly and/or individually or conjunctively. Associated with the at least one air nozzle is or are at least one user-specific parameter and/or at least one configuration, consisting of data assignable to the settings of the components and storable in the position storage unit. The control unit is connectable with a bus system which is present in the motor vehicle and by way of which the control unit receives at least one control command for the at least one air nozzle. This received control command is passed on by the control unit to the memory unit of the at least one air nozzle, in which case the memory unit converts the at least one control command into one or more executable control commands for the at least one means and performs execution by way of the at least one means.

The bus systems integrated in a motor vehicle are usually bulky inhomogeneous systems with a unidirectionally isochronous network with ring topology. Such a system can be used in the form of, for example, a MOST bus or a CAN bus.

In some bus systems, data packets of the same size are sent at the same time intervals. A unitary network cycle is provided. The unitary network cycle is produced by a single subscriber, the so-called 'clock master'. Unidirectional network rings comprise merely a single directional information path. Such bus systems are to be regarded as prior art.

By data assignable to the settings of the components there are to be understood the data of the means which undertake the setting of the components. For that purpose, these means—such as, for example, setting motors—are provided with, for example, sensors which detect the settings or changes. Alternatively, these sensors can also detect the settings of the components relative to the housing or to a predefined reference value.

In an advantageous embodiment of the invention it is provided that the control unit transmits the at least one control command for the at least one air nozzle unidirectionally to the memory unit. By virtue of this embodiment, a bidirectional bus does not have to be present between the control unit and the memory unit; it is sufficient if the control unit transmits the received command simply to the memory unit. The memory unit can thus be of economic construction, since this does not need to have knowledge of a complicated bus protocol, but is designed merely to receive control commands of the control unit and to convert them into control commands for the components of the air nozzle and the actuators, setting motors, etc., thereof and to correspondingly control these.

In a further advantageous embodiment of the invention it is provided that the control unit is designed in such a way that this does not obtain feedback from the memory unit, so that the connection between the control unit and the memory unit is configured to be unidirectional. This reduces the costs of the memory unit and permits it to be of simple design. In addition, a complicated bus control does not have to be implemented.

In an advantageous development it is provided that the at least one user-specific parameter and/or the at least one configuration of the at least one means of the components of the at least one air nozzle can be stored in the position storage unit. Moreover, the memory unit undertakes control of the components of the at least one air nozzle with use of the at least one user-specific parameter and/or the at least one configuration of the components, which is or are storable in the position storage unit. The control unit thus does not have to have knowledge of the means which act on the components of the air nozzle and which change these components in the position thereof in the air nozzle. The memory unit converts a control command received or obtained from the control unit into control commands for controlling the means.

In another embodiment of the invention it is provided that the memory unit determines the at least one user-specific parameter and/or the at least one configuration of the components on the basis of parameters or settings of the at least one means and the memory unit stores this parameter or the setting or settings of the at least one means or, in the case of several means, the settings or parameters of the means in the form of digital data in the position storage unit. Thereafter, the memory unit is quasi freed from the task of storage of data, since this is undertaken by the position storage unit. A setting of the components of the air nozzle can be stored in the position storage unit and reset at a later point in time.

The invention is usable in connection with air nozzles for guidance of an air flow from an air feed shaft or from an air feed duct in heating, ventilating or air-conditioning installations in passenger compartments and load compartments in motor vehicles, land vehicles, air vehicles and water vehicles. Such air nozzles consist of a housing, which is insertable into a wall passage or can be mounted behind such and has a rear-side connection for an air feed shaft or an air feed duct as well as a front-side air outflow opening, wherein arranged in the housing is at least one slat block comprising at least two mechanically intercoupled slats which are so arranged in the slat block that the at least two slats are pivotable about an axis in such a way that through the at least two intercoupled slats the air flow issuing from the air outflow opening of the air nozzle is deflectable in its orientation or the at least two slats almost completely close the air outflow opening in the housing so as to stop the air flow. By virtue of the arrangement of slats mounted in a slat block it is possible to pivot the slats about the bearing axis in the slat block and thus influence the air flow by means of the slats. Moreover, the slat block itself can be pivotable in horizontal and/or vertical position or, however, be rotatable about an axis. The air flow can thus be guided in different directions. By virtue of the mechanical coupling of the slats in the slat block, when one of the slats is moved the other slats are similarly pivoted in the same orientation. Thus, for example, several slats of a slat block can be pivoted in common by only one electric motor.

Air nozzles used in a motor vehicle offer numerous setting possibilities. In order to store a once-set setting detected in terms of data so that this setting can be precisely reset there is a need for a multiplicity of data which are stored in accordance with the invention and, in particular, readily suitable for processing by means of a control unit in accordance with the invention in dependence on setting specifications provided by way of the bus system in a motor vehicle.

In one embodiment according to the invention it is provided that the memory unit communicates with the at least one means and that the at least one means is electric setting means, an actuator, an electric motor or a step motor and serves for setting or adjusting the components of the air nozzle. Insofar as a suitable transmission unit is provided, the slats of a slat block and/or the slat block can be changed in their or its position relative to the air flow by means an electric motor or an actuator.

Moreover, it can be provided that the memory unit is a microcomputer unit or a microcontroller unit and the position storage unit is a fixed-value store, particularly an SRAM store, and/or that the position storage unit is a part of the memory of the microcomputer unit or of the microcontroller unit. Configuration of the position storage unit as an SRAM safeguards the data stored in the position storage unit even in the case of failure of the energy supply, since this has an own energy buffer. However, in principle a volatile memory can also be used if it is ensured that, for example, the data can be called up from another source when the control unit is booted. Through use of an SRAM it is possible to separate the position storage unit from the energy supply and thus a saving of energy, even if only small, can be realized. The position storage unit is to be supplied with energy only when storage of data or reading-out of data takes place.

It is provided that the at least one means also comprises at least one sensor, which detects the setting of the components and the data of which can be called up from the memory unit and stored in the position storage unit, wherein the storage takes place with a relationship to the at least one sensor.

The memory unit is connected with means which set the components in response to the memory unit and/or determine the data of the setting and/or the at least one user-specific parameter and transmit them to the memory unit. The memory unit stores the data of the setting and/or the user-specific parameter in the position storage unit. It is possible through the memory unit to determine the setting data of the components connected with the control unit and to store the data in the position storage unit. The changes, which are undertaken by a user, of the setting possibilities and/or the setting of the components can thus be detected and stored. A setting once undertaken by a user can, after storage of the associated data in the position storage unit, be called up again at any time and reset by the memory unit. It is additionally provided that the at least one sensor serves for detection and ascertaining the setting of the at least two slats of the slat block and/or of the slat block in relation to the housing. The at least one sensor provides the data which define the setting of the slats of the slat block and/or of the slat block. It is particularly advantageous to determine these data in relation to the housing and/or the air flow which is conducted through the housing. The data determined by the sensor are then stored in the position storage unit as setting data of the slats and/or of the slat block.

Moreover, it can be provided that one of the sensors serves for detecting and ascertaining the setting of the at least two slats in the slat block and/or of the slat block in relation to the housing. The setting of the slats in the slat block and also the setting of the slat block can thus be detected. In addition, these data of the sensors can be stored in the position storage unit.

In a further advantageous embodiment of the invention provision is made for an input unit to be provided, in the case of continuing actuation of which by means of inputs by a user the control unit sends to the memory unit commands for setting the components in such a way that at least one component changes the position thereof relative to the housing or to the air flow in the housing and the memory unit stores this change in the position or the changed position of the at least one component in the position memory unit after the continued actuation has ended. There is a possibility of a user manually undertaking the setting of the air nozzle directly at the air nozzle in that the user changes the setting of the slats and/or of the slat block. However, there is also a possibility of being able to change the slats and/or the slat block in the setting thereof by way of an operating unit connected with the control unit. The current data of the setting of the air nozzle are stored in the position storage unit in reaction to a position storage request which can be triggered by either the user or a superordinate control unit of the motor vehicle. This stored position can thus be reset at a later point in time. The storage of the data of the position can take place, for example, when the vehicle is stopped, for example when brought into a parked position.

According to a further teaching it is provided that the memory unit undertakes user-specific allocation of the data stored in the position storage unit, wherein the user-specific recognition is carried out on the basis of a driver identification by the motor vehicle by way of recognition of the vehicle key of the driver, wherein the memory unit stores in the position storage unit an identification, which is associated with the vehicle key, with respect to the data. It is of substantial advantage if the setting of the components of the air nozzle is carried out specifically for a respective user of the motor vehicle. The memory unit therefore additionally stores in the position storage unit, with respect to each position data set of an air nozzle, an identification for the user who has undertaken this setting. This can be carried out, for example, in that each user has input an identification. Alternatively, however, this can also be carried on the basis of data transferred to the bus system. Thus, by then each access key, also termed vehicle key, for a motor vehicle is provided with an identification. The vehicle therefore recognizes the supposed user on the basis of this identification. The memory unit accordingly stores, with respect to each data set, the vehicle key identification and then, when placed in operation, sets the air nozzle on the basis of the position data stored in the position storage unit for a vehicle key identification.

In addition, the memory unit controls the components by way of the at least one means in such a manner that the components execute movement sequences. It is possible in this way to pre-program a demonstration for a user, in the course of which all setting possibilities of the air nozzle are demonstrated to the user.

BRIEF DESCRIPTION OF THE DRAWINGS

The invention is explained in the following by way of exemplifying actual embodiments on the basis of the accompanying figures FIG. 1 to FIG. 4, wherein the figure FIG. 3 consists of the two figures FIG. 3a and FIG. 3b.

This description on the basis of these actual embodiments does not represent limitation of the invention to these actual embodiments. In the figures.

The same reference numerals are used for the same elements in the description of the figures with respect to the figures FIG. 1 and FIG. 2 and the figures FIGS. 3a and 3b. This serves for better understanding of the description of the figures.

DETAILED DESCRIPTION OF THE INVENTION

Figure 1:
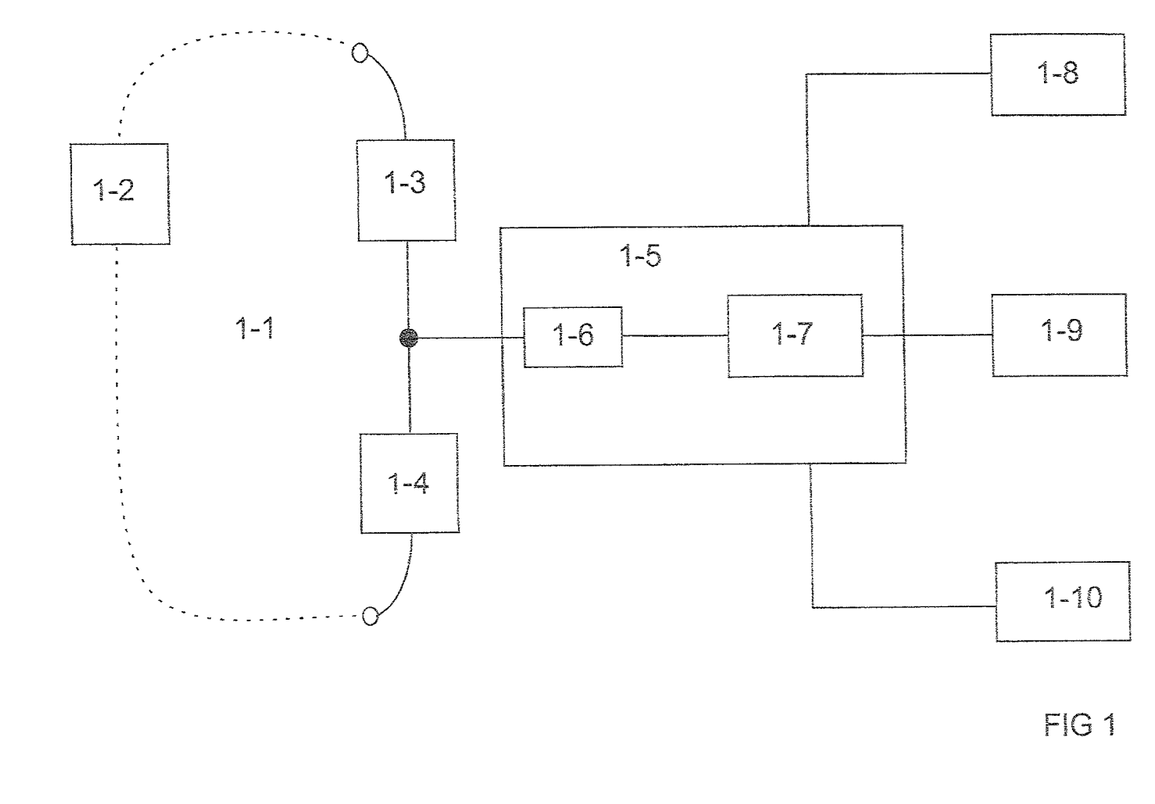
FIG. 1 shows a schematic illustration of a control unit connected with a bus system.
Figure 2:
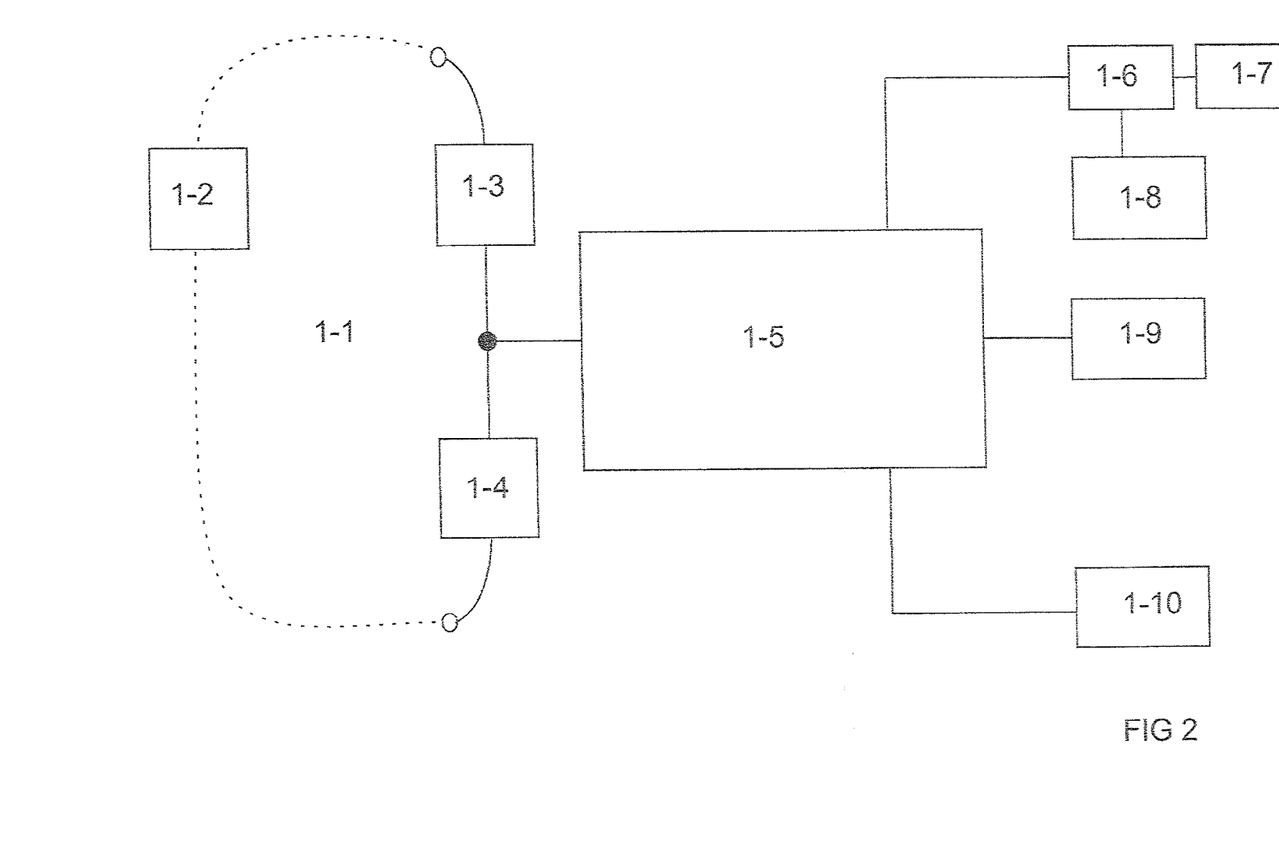
FIG. 2 shows a further schematic illustration of a control unit connected with a bus system.

A typical construction of a bidirectional bus system 1-1 is illustrated in each of FIG. 1 and FIG. 2, in or to which a system with a control unit 1-5 can be integrated or coupled. The bus system 1-1 consists of a so-called master 1-2, which is also termed clock master, as well as further bus components 1-3, 1-4 arranged in the bus system 1-1. These bus components 1-3, 1-4 are, for example, the air-conditioning installation or a further comfort component arranged in a motor vehicle. The components 1-2, 1-3, 1-4 of the bus system 1-1 are all connected together unidirectionally. The clock master 1-2 controls the function of the bus system 1-1 as well as the time cycle for transmission of the data packets in the bus system 1-1. The further components 1-3 and 1-4 are filed with fixed addresses at the clock master 1-2. This means that the clock master 1-2 can precisely respond to these network subscribers 1-3 and 1-4 by address and transmit the data thereof to these subscribers by address.

In addition, the control unit 1-5 is present. This can be incorporated in the network of the bus system 1-1. An appropriate address can also be assigned to the control unit 1-5. In an alternative embodiment of the invention provision is made for integration in the control unit 1-5 of a monitoring unit which monitors the data, which is transmitted in the bus system 1-1 with respect to a presettable address and, when data for this address are transmitted, extracts these from the bus system 1-1. Such a procedure is relevant particularly when the bus system 1-1 is not to be expanded in extreme manner. In this case, the control unit 1-5 takes over the task as slave in the bus system 1-1 and waits for an appropriate identification address. In the case of an air nozzle this is, for example, the signal of insertion of the ignition key, by which at the same time the identification of the driver assigned to this ignition key is transmitted. If such an address data set is transmitted, the control unit 1-5 recognizes this, extracts these data from the data flow, evaluates these and correspondingly controls the components 1-8, 1-9, 1-10 to be connected therewith, as will be illustrated in the following.

The control unit 1-5 in the embodiment according to FIG. 1 comprises a memory unit 1-6 as well as a position storage unit 1-7. In the embodiment according to FIG. 2 the memory unit 1-6 and the position storage unit 1-7 are arranged at the air nozzle 1-8 or are a component of the air nozzle 1-8.

In the position storage unit 1-7 according to the embodiment in accordance with FIG. 1, a plurality of position data, namely setting data, for further components 1-8, 1-9, 1-10 to be connected with the control unit 1-5 can be stored and, in particular, always with reference to the driver identification, which the control unit 1-5 extracts from the bus system 1-1, as well as respective setting parameters or setting configurations assigned to the individual connected components 1-8, 1-9, 1-10.

In the position storage unit 1-7 according to the embodiment in accordance with FIG. 2 a plurality of position data, namely setting data, of components of the air nozzle 1-8 can be stored and, in particular, again with respect to the driver identification which the control unit 1-5 obtains from the bus system 1-1.

The component 1-8 is, for example, an air nozzle, the component 1-9 is an LED unit for internal lighting of a motor vehicle and the component 1-10 is a further comfort device, for example a further air nozzle.

A user now sets by way of an operating unit, which is not illustrated in FIG. 1, and by way of electronic/electrical setting units, which are arranged at the air nozzle 1-8, such as actuators and/or electric motors, the air nozzle in the way the user would like to have it during travelling. These data are stored by the control unit 1-5 according to FIG. 1 in the position storage unit 1-7 in each instance with respect to the corresponding code identification. In accordance with the embodiment according to FIG. 2, the memory unit 1-6 undertakes this storage directly.

The control unit 1-5 now controls, as soon as the vehicle is stopped and the vehicle key is withdrawn and this information is provided by way of the bus system 1-1, the air nozzle 1-8 into a neutral starting position, for example the air nozzle is closed by way of a flap mechanism so that there is no longer any opening of the air nozzle with respect to the interior space of the vehicle. If the vehicle is now started again by way of the vehicle key, then the control unit 1-5 recognizes this and correspondingly controls the memory unit 1-6 so that this extracts the correspondingly associated data from the position storage unit 1-7 and on the basis thereof appropriately sets the air nozzle 1-8 with the setting configuration data in the way the driver has stored this or in the way the air nozzle 1-8 was set at the point in time when the driver removed the vehicle key or stopped the vehicle.

The data for the setting of the air nozzle 1-8 are stored in the position storage unit 1-7 and are not transferred to the clock master 1-2 and/or a memory unit arranged in the bus system 1-1. This relieves the bus system 1-1 of load and reduces the incidence of data and at the same time makes it possible to flexibly accommodate the possibilities of setting the air nozzle 1-8 and to specifically adapt the control unit 1-5 and/or the memory unit 1-6 and the position storage unit 1-7 to the requirements and technical specifications of the air nozzle 1-8. This also makes it possible to subsequently retrofit an air nozzle with a number of new or further setting possibilities. Only the memory unit 1-6 and optionally the position storage unit 1-7 then have to be appropriately reprogrammed. If, however, these are a component of the air nozzle 1-8 in accordance with FIG. 2, then this can be directly taken into consideration in the redesign of the air nozzle 1-8 or the redevelopment or the adaptation or modification thereof; then only adaptation to the control unit 1-5 has to be carried out.

In an advantageous embodiment of the invention the control unit 1-5 is also integrated in the air nozzle.

The component 1-9 is an LED unit for internal lighting of a motor vehicle. Here, too, the control unit 1-5 is used. Depending on the identification of the driver, which is carried out—as already described—by way of the key, a setting for the internal lighting as once used by a driver can be appropriately stored in the position storage unit 1-7 and by way of the memory unit 1-6 this is correspondingly reproduced at the LED unit 1-9 on recognition of a driver and correspondingly set.

In FIG. 1 the memory unit 1-6 is connected with the air nozzle 1-8 as well as the further components 1-9, 1-10 in such a way that the memory unit 1-6 recognizes the individual actuators or electric motors or the further elements of the air nozzle 1-8 and/or of the further components 1-9, 1-10, which correspondingly produce the settings and parameters of the components 1-9 to 1-10, and takes over the determined data.

In FIG. 2 the memory unit 1-6 is a component of the air nozzle 1-8 or directly connected therewith. The memory unit 1-6 controls the individual actuators or electric motors or the further elements of the air nozzle 1-8 which appropriately produce the settings and parameters of the components of the air nozzle 1-8.

The bus system, which is described with respect to FIG. 1, with the associated elements is illustrated in FIG. 2 changed in such a way that the memory unit 1-6 and the position store 1-7 are directly associated with the air nozzle 1-8 and in an advantageous embodiment of the invention are integrated therein as a component. Control commands for the air nozzle 1-8 received by the control unit 1-5 from the bus system 1-1 are sent by the control unit 1-5 directly to the memory unit 1-6.

Figure 4:
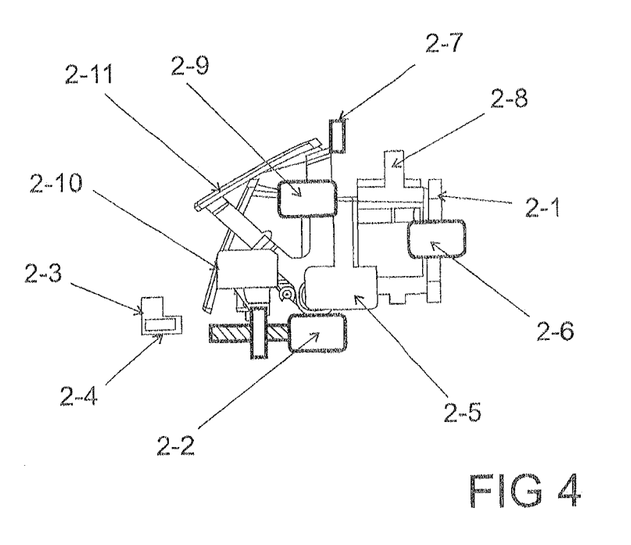
FIG. 4 shows an air nozzle in schematic illustration.

An air nozzle 2-1 for a motor vehicle is schematically illustrated in FIG. 4. The air nozzle 2-1 comprises a plurality of electronic/electrical components 2-2 to 2-10, for example sensors 2-3, 2-4, 2-7, 2-8, which serve the purpose of recognizing the setting of corresponding air guide means or flaps of an air nozzle and of enabling storage of the correspondingly set values in the position storage unit 1-7. Moreover, actuators or electric motors 2-2, 2-5, 2-6, 2-9, 2-10, which make the individually adjustable elements of an air nozzle 2-1 electrically operable and adjustable, are present. Several slats, which are mounted in several slat blocks, are present in the air nozzle 2-1, but these are not illustrated in FIG. 2. In addition, a closure flap 2-11 is provided, which completely closes the air outlet opening of the air nozzle 2-1 in the closed state, preferably relative to the vehicle interior space.

Figure 3A:
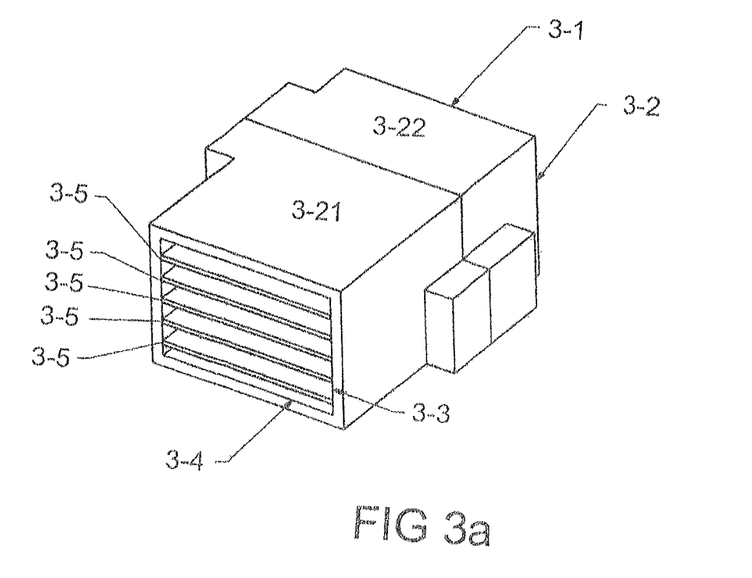
FIG. 3a shows a perspective illustration of an air nozzle.
Figure 3B:
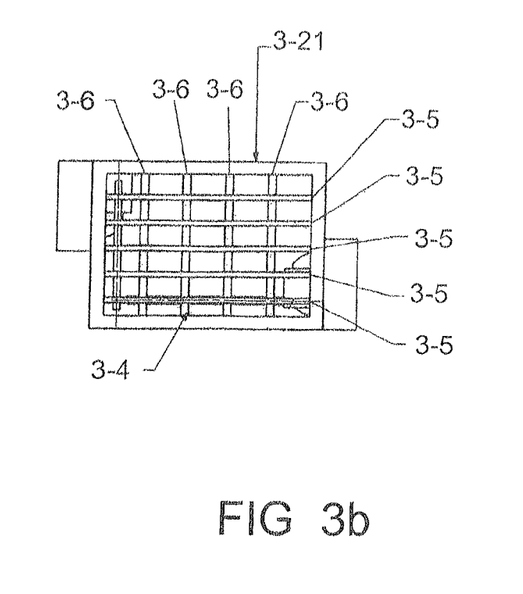
FIG. 3b shows a front view of an air nozzle.

A perspective illustration of an air nozzle and a front view of the air nozzle are illustrated in FIG. 3a and FIG. 3b. Since the same air nozzle is concerned, but in different views, the figures FIG. 3a and FIG. 3b are largely described conjunctively in the following and use is made of the same reference numerals for the same elements in the two figures FIG. 3a and FIG. 3b.

The air nozzle 3-1 consists of a housing 3-2. The housing 3-2 is, in principle, of block-shaped construction. The housing 3-2 has a wall which forms the housing outer side and inner side. An air outlet opening is provided in the front region of the housing 3-2. An air feed opening is provided at the opposite side of the air nozzle 3-1 opposite the air outlet opening.

The air nozzle 3-1 is provided as an air nozzle for installation/use in a passenger compartment in a motor vehicle. The air nozzle 3-1 serves for guidance of an air flow from an air feed shaft or an air feed duct of a heating, ventilating or air-conditioning installation in a motor vehicle.

The air nozzle 3-1 is insertable into a wall passage, preferably a passage in a dashboard, or mountable behind such. At the rear side, an air flow guidable by way of air guide elements 3-3, 3-4, 3-5, 3-6 arranged in the housing 3-2 can be fed to the housing 3-2 by way of the air feed opening. For that purpose, at least two separate slat blocks 3-3, 3-4 arranged at an angle relative to one another are present in the housing 3-2. Each of the slat blocks 3-3, 3-4 comprises a plurality of mechanically intercoupled slats 3-5, 3-6.

The slats 3-5, 3-6 of each of the slat blocks 3-3, 3-4 are mechanically coupled with one another in such a way that on movement of one of the slats 3-5, 3-6 of a slat block 3-3, 3-4 all slats 3-5, 3-6 of a slat block 3-3, 3-4 are conjunctively moved equally and at the same time.

The slat blocks 3-3, 3-4 are arranged in the housing 3-2 in such a way that these are fixedly connected with the housing 3-2. In the concrete embodiment of the invention the first slat block 3-3 with the slats 3-5 arranged therein is configured in such a way that the slats 3-5 are arranged in horizontal orientation with respect to the housing 3-2 and the slats 3-6 of the slat block 3-4 are turned relative to the slat block 3-3 through 90°. They are thus arranged vertically in the housing 3-2. The slat block 3-3 and the slat block 3-4 are arranged one behind the other.

In an advantageous embodiment of the invention it is provided that the slat blocks 3-3, 3-4 are also so arranged in the housing 3-2 that these are movable and pivotable about the horizontal plane and the vertical plane at least in a smaller pivot range.

In a further advantageous embodiment of the invention the slat blocks 3-3, 3-4 and the slats 3-5, 3-6 arranged in the slat blocks 3-3, 3-4 are arranged at different angles with respect to one another. Thus, the slats 3-5 of the first slat block 3-3 can be arranged to be turned or displaced through 45° or through 60° relative to the slats 3-6 of the second slat block 3-4.

In a further advantageous embodiment of the invention it is provided that the slat blocks 3-3, 3-4 are arranged to be turned relative to one another through 45°.

According to the embodiment in accordance with the figures FIG. 3a and FIG. 3b it is provided that the slat blocks 3-3, 3-4 are mounted in a device in the housing 3-2 so that the slat blocks 3-3, 3-4 can be rotated conjunctively or each slat block 3-3, 3-4 can be rotated individually in the housing 3-2 about an axis of rotation extending along the air flow.

Through the change in the position of the slats 3-5, 3-6 of a slat block 3-3, 3-4 the air flow which enters rearwardly into the air nozzle 3-1 and exits at the front by way of the air outlet opening is changeable and deflectable.

This deflection or change of the air flow takes place in dependence on the setting of the slats 3-5, 3-6.

Moreover, it is provided that the slats 3-4, 3-6 of the slat blocks 3-3, 3-4 are actuable in such a way that they more or less close the air outflow opening so that the air flow is prevented by means of the slats 3-3, 3-4.

Electric motors serving for setting the slats 3-5, 3-6 and/or the slat blocks 3-3, 3-4 are arranged at or in the housing 3-2.

In addition, the electronic control unit which undertakes setting of the slats 3-5, 3-6 and/or of the slat blocks 3-3, 3-4 in the prescribed manner is present.

The housing 3-2 consists of two housing halves 3-21, 3-22, which are separably connected together. In that regard it is advantageous that the housing 3-2 is divisible into two parts. This makes it possible to break down the housing 3-2, even after assembly, back into the two halves 3-21 and 3-22.

The housing 3-2 has at least one of its outer sides a connecting unit for electrical contact-making and/or electrical connection of the air nozzle 3-1 with the memory unit 1-6. Moreover, the electrical power supply of the electric motors is provided by way of this connecting unit. From the connecting unit, lines arranged for electrical energy conduction from the connecting unit to the electric motors are provided. In an advantageous embodiment it is provided that these current conducting lines are designed in the form of conductor tracks which are let into the housing 3-2 or arranged at the housing 3-2. A cable connection can also be used for this purpose in simple manner. This is then to be fixed in suitable form at or in the housing 3-2, for example by gluing or by a clamping device.

Moreover, it is provided that further control lines or control conductor tracks are present at the housing 3-2 to the electric motors and/or sensors. The sensors serve as transmitters in order to correspondingly detect the position of the slats 3-5, 3-6 and/or the slat blocks 3-3, 3-4. These data are supplied to the memory unit 1-6, which stores these data in suitable form in the position storage unit 1-7.

Moreover, it is provided that in addition to the slat blocks 3-3, 3-4 and the slats 3-5, 3-6 arranged in the slat blocks 3-3, 3-4 a closure unit for the air nozzle 3.1, which closure unit closes the air outlet opening in the case of non-use of the air nozzle 3-1, is present.

REFERENCE NUMERAL LIST 1-1 bus system
1-2 clock master
1-3 component
1-4 component
1-5 control unit
1-6 memory unit
1-7 position storage unit
1-8 air nozzle
1-9 LED unit
1-10 comfort component
2-1 air nozzle
2-2 electric motor
2-3 sensor
2-4 sensor
2-5 electric motor
2-6 electric motor
2-7 sensor
2-8 sensor
2-9 electric motor
2-10 electric motor
2-11 closure flap
3-1 air nozzle
3-2 housing
3-21 housing half
3-22 housing half
3-3 slat block
3-4 slat block
3-5 slats
3-6 slats

The invention claimed is:

1. A system with a control unit for controlling at least one air nozzle,
    wherein the air nozzle comprises components for influencing air flow conducted through the air nozzle, and electronic units, which control the components, in the form of a memory unit and a position storage unit, wherein the memory unit is connected so that the components are settable singly and/or individually or in common,
    wherein at least one user-specific parameter and/or at least one configuration, which consists or consist of data with respect to the settings of the components of the air nozzle, are assignable to the at least one air nozzle, which data are stored in the position storage unit,
    wherein the control unit conducts to the memory unit of the at least one air nozzle at least one control command, which is received by a connected bus system, for the at least one air nozzle,
    wherein the memory unit converts the at least one control command into one or more executable control commands and carries out execution thereof by way of the at least one connection,
    wherein the at least one connection also comprises at least one sensor which detects the setting of the components and the data of which can be called up by the memory unit and stored in the position storage unit, wherein the storage takes place with reference to the at least one sensor, and
    wherein the memory unit so controls the components by way of the at least one connection that the components execute movement sequences.

2. The system according to claim 1, wherein the control unit conducts the at least one control command for the at least one air nozzle unidirectionally to the memory unit.

3. The system according to claim 1, wherein the control unit is so designed that this receives no feedback from the memory unit so that the connection between the control unit and the memory unit has a unidirectional configuration.

4. The system according to claim 1, wherein the at least one user-specific parameter and/or the at least one configuration of the at least one connection of the components of the at least one air nozzle is or are storable in the position storage unit and the memory unit undertakes control of the components of the at least one air nozzle with use of the at least one user-specific parameter and/or the at least one configuration of the components stored in the position storage unit.

5. The system according to claim 1, wherein the memory unit determines the at least one user-specific parameter and/or the at least one configuration of the components on the basis of parameters or settings of the at least one connection and the memory unit stores these parameters or the setting or settings of the at least one connection or, in the case of presence of several connections, the settings or parameters of the connection in the form of digital data in the position storage unit.

6. The system according to claim 1, wherein the air nozzle serves for guidance of an air flow from an air feed shaft or from an air feed duct in heating, ventilating or air-conditioning installations for passenger compartments, load compartments or vehicle driver cabins in motor vehicles, land vehicles, air vehicles or water vehicles.

7. The system according to claim 1, wherein the air nozzle comprises a housing which is insertable into a wall passage or mountable therebehind and has at the rear side a connection for an air feed shaft or an air feed duct as well as an air outflow opening at a front side, wherein arranged in the housing is at least one slat block comprising at least two mechanically intercoupled slats which are so arranged in the slat block that the at least two slats are pivotable about an axis in such a manner that the air flow issuing from the air outflow opening of the air nozzle is deflectable in its orientation by the at least two intercoupled slats or the at least two slats almost completely close the air outflow opening in the housing so as to prevent the air flow.

8. The system according to claim 7, wherein one of the sensors serves for detection and ascertaining the setting of the at least two slats of the slat block and/or of the slat block in relation to the housing.

9. The system according to claim 1, wherein the memory unit communicates with the at least one connection and that the at least one connection is an electrical setting connection or an actuator or an electrical motor or a step motor and serves for setting or adjusting the components of the air nozzle.

10. The system according to claim 1, wherein the memory unit comprises a microcomputer unit or a microcontroller unit and the position storage unit is a fixed value memory, particularly an SRAM memory, and/or that the position storage unit is a part of the memory of the microcomputer unit or of the microcontroller unit.

11. The system according to claim 1, wherein an input unit is provided, on the continuing actuation of which by inputs by a user the control unit transmits to the memory unit commands for setting the components in such a way that at least the components change the positions thereof relative to the housing or the air flow in the housing, and the memory unit after the continuing actuation has concluded stores in the position storage unit this change in the positions or the changed position of the at least one component.

12. The system according to claim 1, wherein the memory unit provides user-specific assignment of the data stored in the position storage unit, wherein the user-specific recognition takes place on the basis of a driver identification by the motor vehicle on the basis of recognition of the vehicle key of the driver, wherein the memory unit stores in the position storage unit with respect to the data an identification associated with the vehicle key.

* * * * *

UNITED STATES PATENT AND TRADEMARK OFFICE
CERTIFICATE OF CORRECTION

PATENT NO. : 9,604,523 B2
APPLICATION NO. : 14/907224
DATED : March 28, 2017
INVENTOR(S) : Schwarz et al.

It is certified that error appears in the above-identified patent and that said Letters Patent is hereby corrected as shown below:

On the Title Page

Page 2, item (56) under FOREIGN PATENT DOCUMENTS, Column 2, Line 9, "WO 2007/004987" should be --WO 2007/004984--.

Signed and Sealed this
Seventeenth Day of April, 2018

Andrei Iancu
*Director of the United States Patent and Trademark Office*